(12) United States Patent
Liu (10) Patent No.: US 7,979,653 B2
(45) Date of Patent: Jul. 12, 2011

(54) FILE-COPYING APPARATUS OF PORTABLE STORAGE MEDIA

(76) Inventor: Jui-Feng Liu, Chu-Pei (TW)

( * ) Notice: Subject to any disclaimer, the term of this patent is extended or adjusted under 35 U.S.C. 154(b) by 687 days.

(21) Appl. No.: 12/025,620

(22) Filed: Feb. 4, 2008

(65) Prior Publication Data

US 2009/0198922 A1    Aug. 6, 2009

(51) Int. Cl.
*G06F 12/16* (2006.01)
(52) U.S. Cl. ........................................ 711/162; 711/161
(58) Field of Classification Search .................. 711/161, 711/162; 714/5, 6
See application file for complete search history.

(56) References Cited

U.S. PATENT DOCUMENTS

| 2003/0191916 A1* | 10/2003 | McBrearty et al. | 711/162 |
| 2005/0086413 A1* | 4/2005 | Lee et al. | 710/313 |

* cited by examiner

*Primary Examiner* — Jae U Yu
(74) *Attorney, Agent, or Firm* — Birch, Stewart, Kolasch & Birch, LLP (57) ABSTRACT

The present invention provides a portable file-copying apparatus which includes a first connecting unit, a second connecting unit, and a control unit. The first connecting unit can receive a first portable storage media which includes an original file. The second connecting unit can receive a second portable storage media. Furthermore, the control unit is connected to the first connecting unit, the second connecting unit, and a memory. The control unit is applied for storing the original file in the memory, and copying the file to the second portable storage media in accordance with a control signal.

9 Claims, 9 Drawing Sheets

Fig.5B

FILE-COPYING APPARATUS OF PORTABLE STORAGE MEDIA

FIELD OF THE INVENTION

The present invention relates a file-copying apparatus, it more specifically relates to a file-copying apparatus applied as portable storage media.

BACKGROUND OF THE INVENTION

Along with the fast development in information technology industry, computer peripheral product has become indispensable assisted tool in the life of modern people. Among them, portable storage media, for example USB portable disk, memory card of all kinds of specs, small dimension hard disk, etc., are some of the most commonly used computer peripheral products. This is especially true for USB portable disk. Since it has the advantages such as: light and convenient, plug and play, low cost, sufficient storage capacity, etc., it thus becomes the most important data storage and carrying media in all industries and in the daily life.

However, when the user wants to copy the data in USB PORTABLE DISK to other USB PORTABLE DISK, memory card or other portable disk, the data must be copied first copied to the computer, and then the data is copied from the computer to other USB PORTABLE DISK, memory card or portable hard disk. Although such operation process is much more convenient than the use of floppy disk in the past for the data access, yet computer still has to be used as the media before data can be successfully accessed or copied to other portable storage media, this is really inconvenient in some degree in its use.

As mentioned above, how to copy the data in USB PORTABLE DISK to other portable storage media without using a computer is really one of the most important topics for people in the related technology fields.

SUMMARY OF THE INVENTION

Therefore, one of the scopes of the present invention is to provide a file-copying apparatus to be applied in portable storage media. What is special is, the file-copying apparatus of portable storage media of the present invention can copy the data from USB PORTABLE DISK to other portable storage media without the need of a computer, and the trouble in the prior art can thus be solved so that the user can operate the apparatus more easily.

According to a better embodiment of the present invention, the portable file-copying apparatus of the present invention includes a first connecting unit, a second connecting unit and a control unit. The first connecting unit can receive a first portable storage media, and the first portable storage media includes an original file. The second connecting unit can receive a second portable storage media. In addition, the control unit can be connected respectively to the first connecting unit, the second connecting unit and a memory unit so as to, in accordance with a control signal, store the original file to the memory unit and to copy the original file to the second portable storage media.

According to another better embodiment, the portable file-copying apparatus of the present invention includes a connecting plug unit, a connecting socket unit, a first memory unit, a second memory unit and a control unit. The connecting plug unit can receive a data processing device; and the connecting socket unit can receive a first portable storage media and/or a second portable storage media, furthermore, the first portable storage media includes an original file.

In addition, the first memory unit includes a flash memory, and the second memory unit includes a random memory furthermore, the control unit is connected respectively to the connecting plug unit, the connecting socket unit, the first memory unit and the second memory unit so as to, in accordance with a control signal, have data access selectively to the data processing device; moreover, the control unit can, in accordance with the control signal, copy selectively the original file to the first memory unit or the second memory unit.

The advantages and spirit of the present invention can be further understood through the detailed description as follows and the drawings attached.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

This invention provides a portable file-copying apparatus. In the followings, embodiments and real applied cases of the present invention are going to be described in details so as to fully describe the features, spirit and advantages of the present invention.

Figure 1:
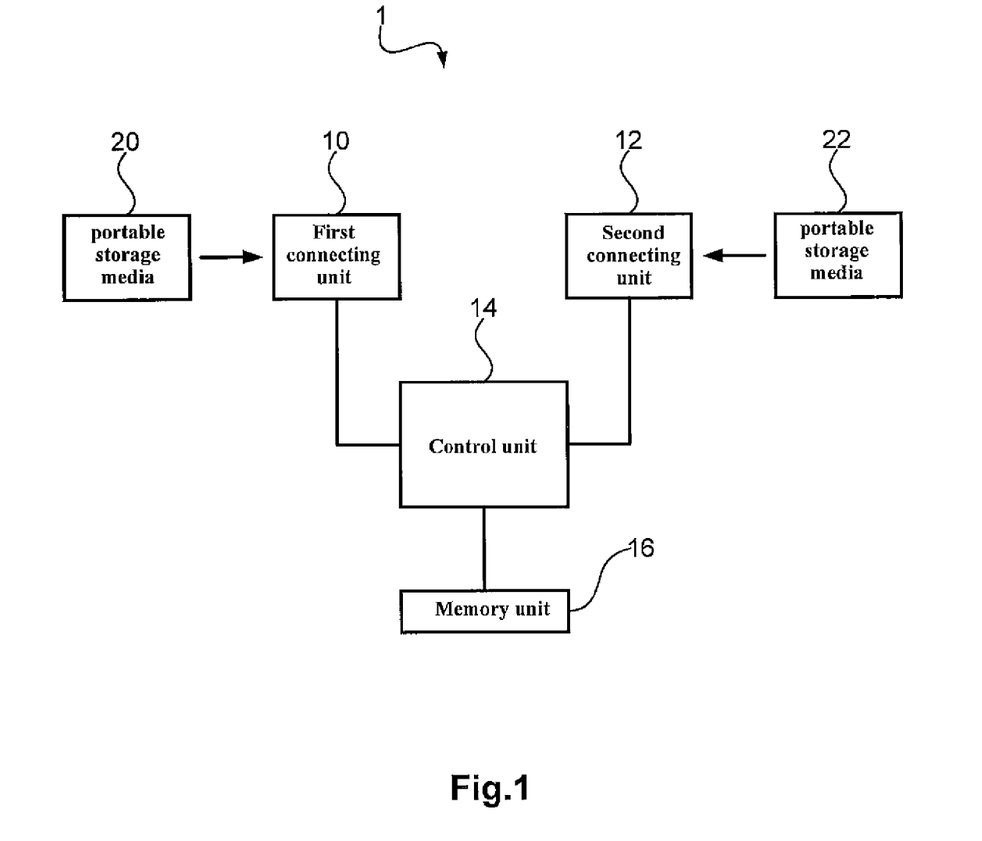
FIG. 1 illustrates the functional block diagram of an embodiment of portable file-copying apparatus of the present invention.

Please refer to FIG. 1, which shows the functional block diagram of portable file-copying apparatus of one of the embodiments of the present invention. As shown in FIG. 1, the portable file-copying apparatus 1 of the present invention includes first connecting unit 10, second connecting unit 12 and control unit 14.

First connecting unit 10 can receive a portable storage media 20, and second connecting unit 12 can receive another portable storage media 22. In addition, portable storage media 20 includes original file, for example, but not limited to document file, sound file, image file and system file. In real application, portable storage media 20, 22 can include, for example, but not limited to, flash memory or hard disk.

In other words, portable storage media 20, 22 can be, but not limited to, for example, USB PORTABLE DISK, memory card of all kinds of specs or portable hard disk. In addition, first connecting unit 10 and second connecting unit 12 can include, depending on the need, appropriate structure, for example, USB connecting structure, IEEE 1394 connecting structure, or other appropriate connecting structure.

Furthermore, control unit 14 is connected respectively to a first connecting unit 10, a second connecting unit 12 and a memory unit 16, so as to save the original file in a portable storage media 20 to the memory unit 16 in accordance with a control signal and save the original file to portable storage media 22.

Figure 2A:
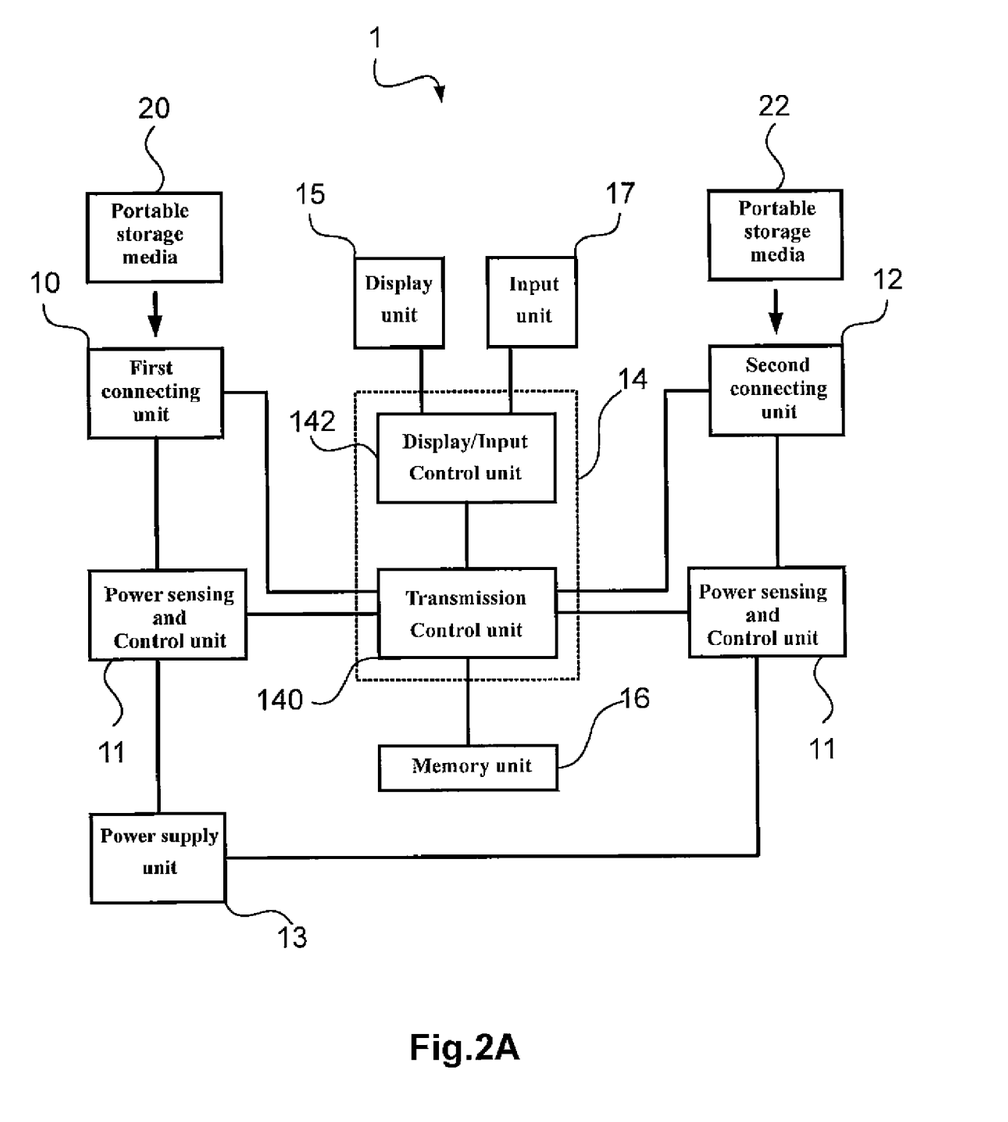
FIG. 2A illustrates the functional block diagram of an embodiment of portable file-copying apparatus of the present invention.
Figure 2B:
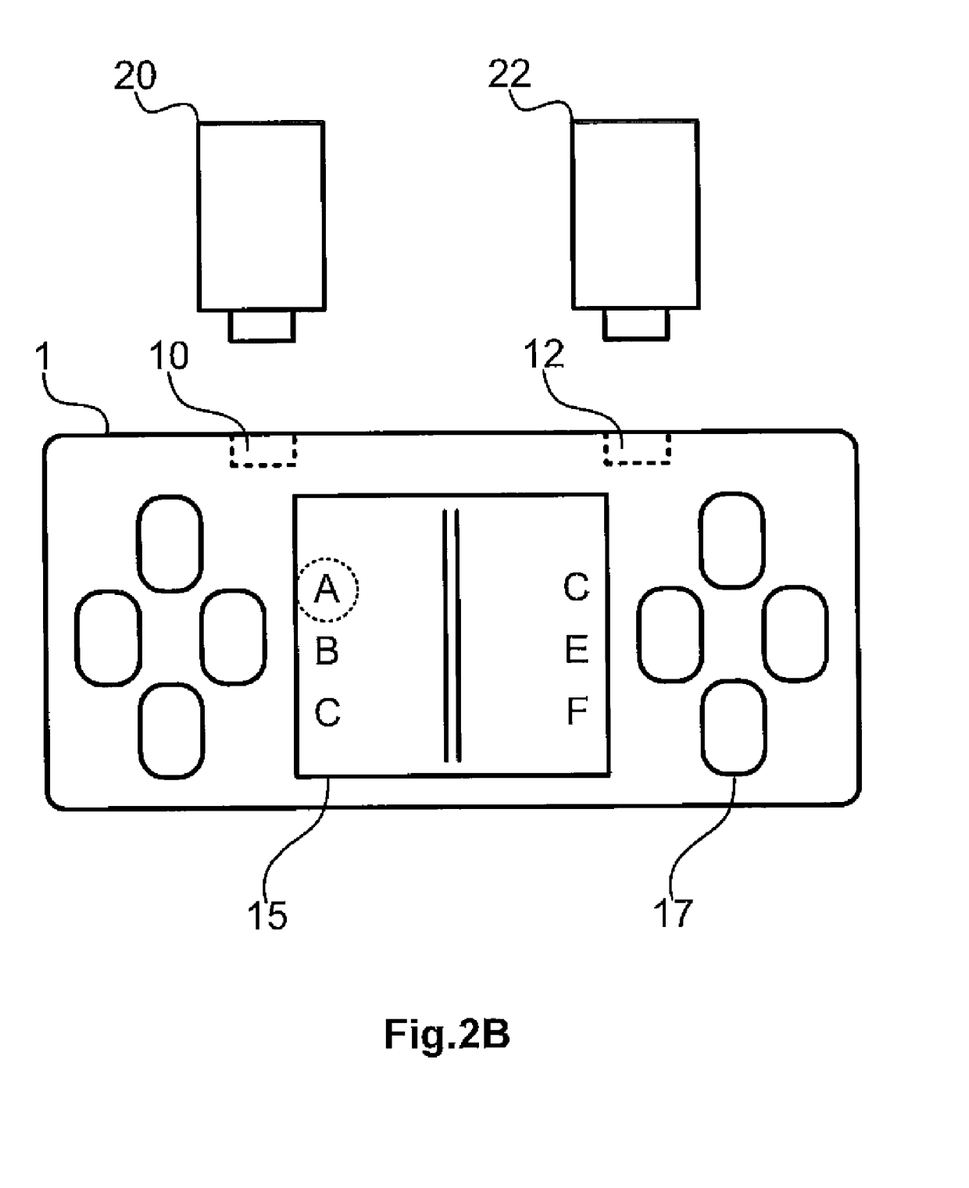
FIG. 2B illustrates the portable file-copying apparatus of FIG. 2A.

Please refer together to FIG. 2A and FIG. 2B. FIG. 2A shows the functional block diagram of the portable file-copying apparatus of one embodiment of the present invention; meanwhile, FIG. 2B is an illustration of the portable file-copying apparatus of FIG. 2A. As shown in FIG. 2A and FIG. 2B, the portable file-copying apparatus 1 of the present invention, in addition to the above mentioned first connecting unit 10, second connecting unit 12 and control unit 14, can also include power sensing and control unit 11, power supply unit 13, display unit 15 and input unit 17. In addition, control unit 14 can further include transmission control unit 140 and display/input control unit 142.

Power sensing and control unit 11 are connected respectively to first connecting unit 10 and the transmission control unit 140 of control unit 14. Meanwhile, power sensing and control unit 11 can detect the operation speed of portable storage media 20, for example, the transmission speed. Power supply unit 13 can be connected to power sensing and control unit 11; meanwhile, through power sensing and control unit 11, power can be supplied to portable storage media 20, 22. In addition, power supply unit 13 can supply the power needed by portable file-copying apparatus 1 of the present invention. In real application, power supply unit 13 can be, but not limited to, general battery or rechargeable battery. Meanwhile, power supply unit 13 can supply power together with voltage-raising circuit.

Display unit 15, for example, but not limited to, LCD display screen or OLED display screen, can be connected to display/input control unit 142 so as to display the related information regarding portable storage media 20, 22 and memory unit 16; for example, but is not limited to, the used capacity, residual capacity and file name, etc. For example, the left side of the display unit 15 of FIG. 2B shows the original file name A, B, C stored in portable storage media 20; and the right side shows the file name C, E, F stored in portable storage media 22.

Input unit 17, for example, but not limited to, key pad, touch panel, joy stick and roller, etc.; can be connected to display/input control unit 142 so that the user can input the control signal in accordance with display unit 15. In real application, input unit 17 can be integrated with display unit 15 to a touch control screen.

Transmission control unit 140 is connected to first connecting unit 10, second connecting unit 12, memory unit 16 and display/input control unit 142. Display/input control unit 142 is connected to display unit 15 and input unit 17. In addition, display/input control unit 142 can control display unit 15 and receive the control signal generated by the user for operating input unit 17 and then send the control signal to transmission control unit 140; moreover, transmission control unit 140 will, in accordance with control signal, save the original file in portable storage media 20 to memory unit 16 and then copy the original file to portable storage media 22.

For example, display unit 15 can display many original files A, B, C displayed by portable storage media 20 and the user can, through input unit 17, select the original file (for example, original file A) to be copied; meanwhile, when the user makes a selection, input unit will issue control signal to display/input control unit 142, and the display/input control unit 142 will then send the control signal to transmission control unit 140. Furthermore, transmission control unit 140 will, in accordance with control signal, save the original file A to memory unit 16 and copy original file A to portable storage media 22.

Figure 3A:
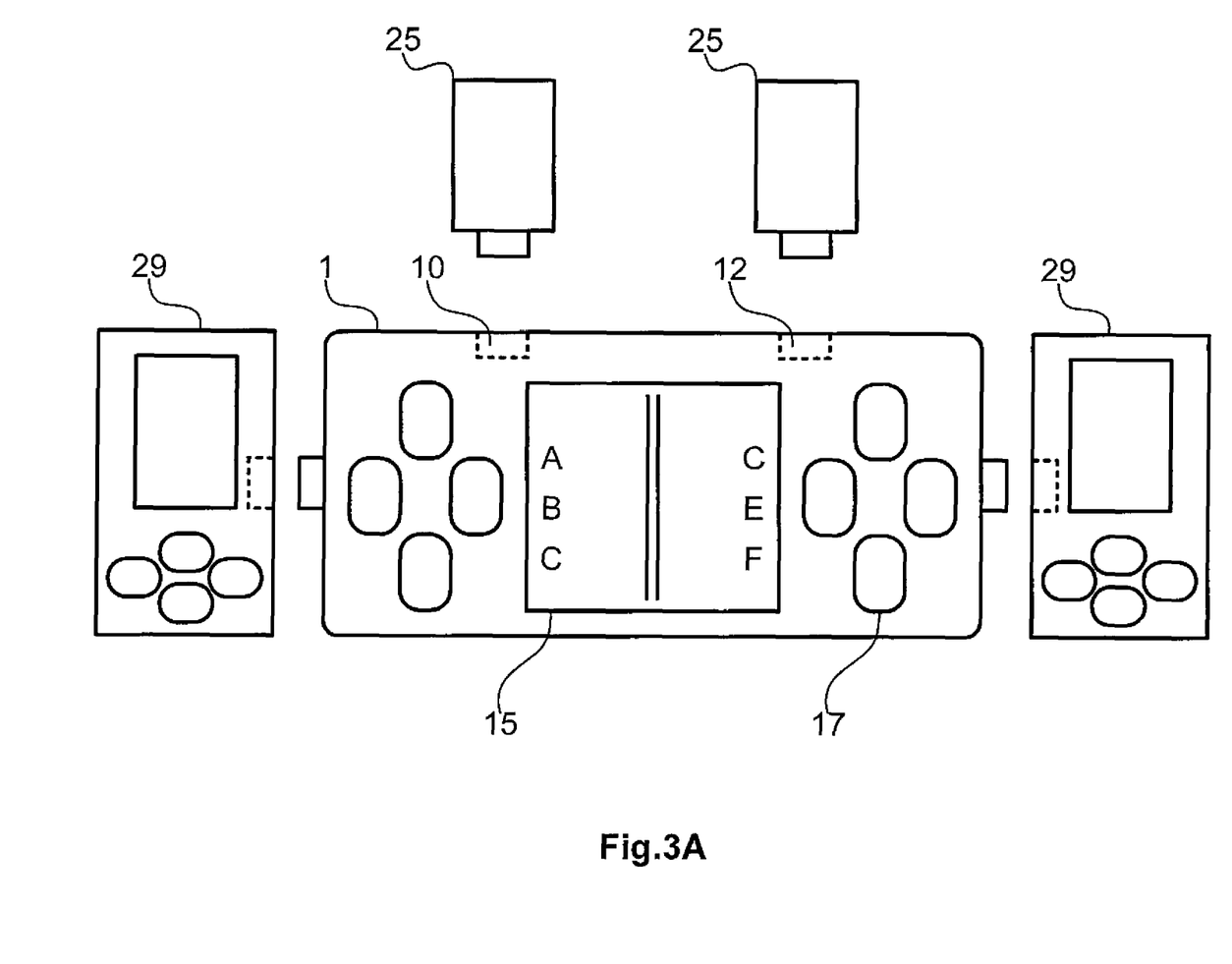
FIG. 3A to 3C show respectively portable file-copying apparatus of the present invention.
Figure 3B:
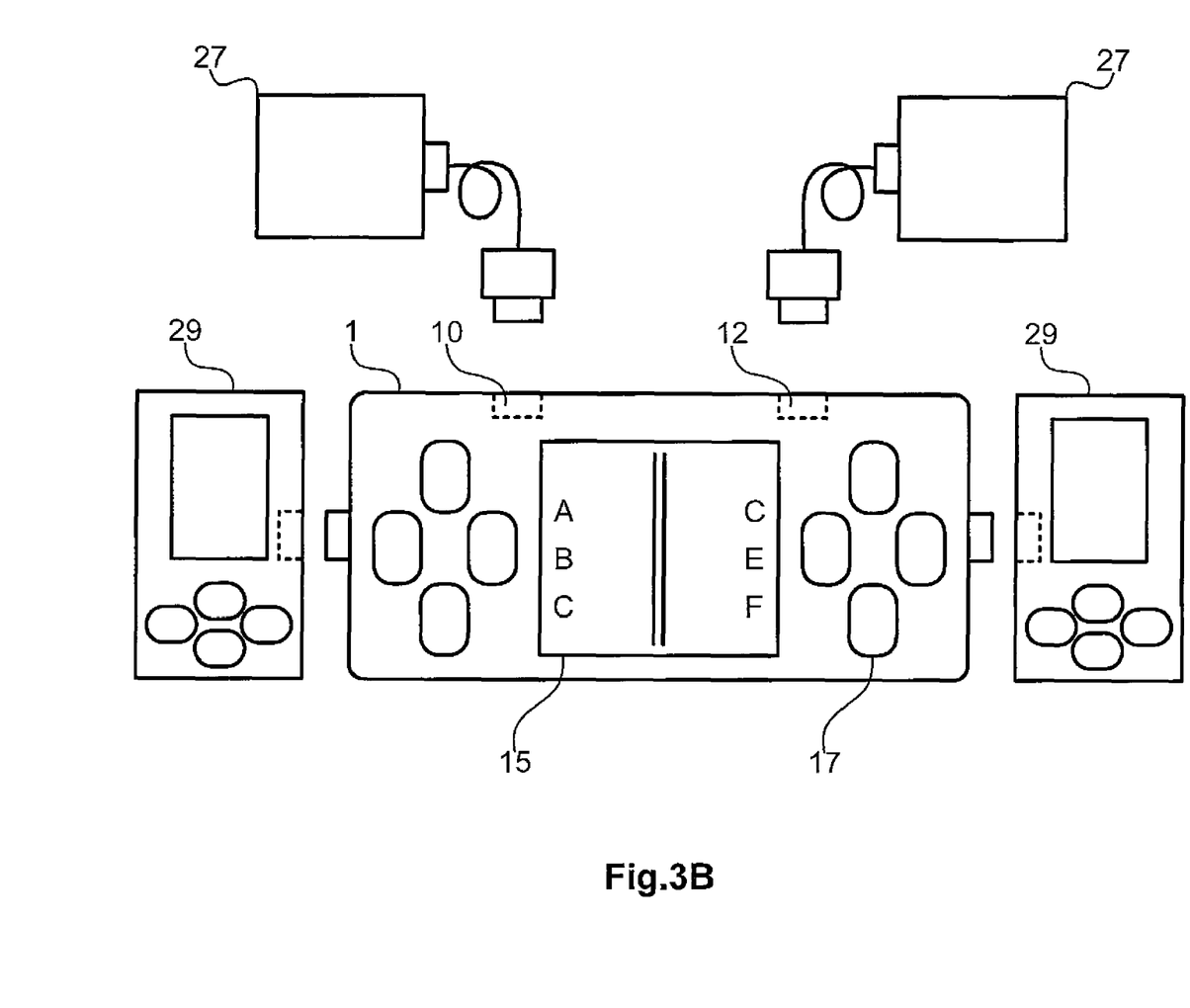
Figure 3C:
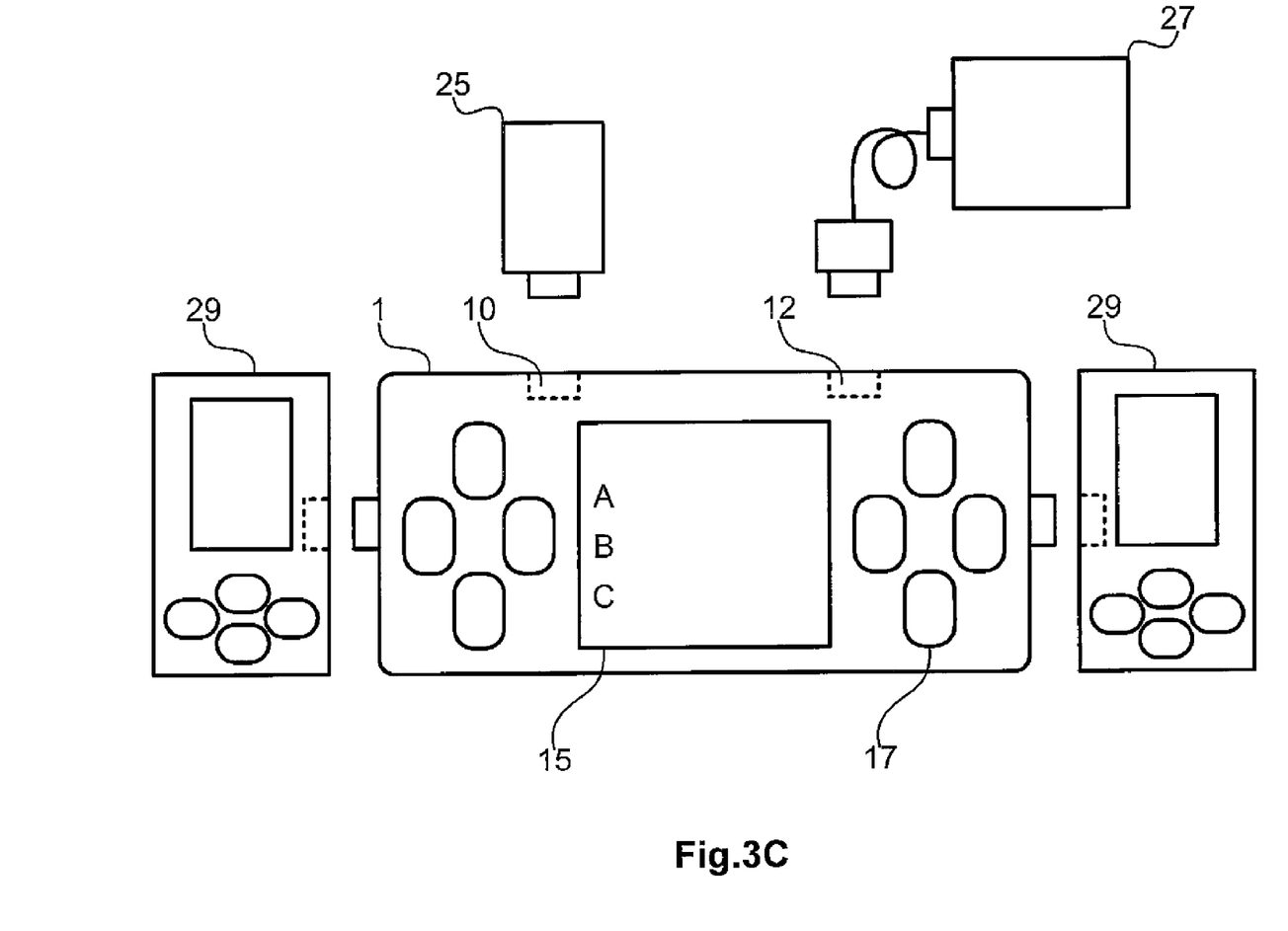

Please refer again to FIG. 3A to FIG. 3C, which are illustrations of the portable file-copying apparatus of the present invention. As shown in those figure, the portable file-copying apparatus I of the present invention can be connected respectively to portable storage media such as: USB PORTABLE DISK 25, portable hard disk 27 and MP3/MP4 portable disk 29, etc. Meanwhile, the portable file-copying apparatus 1 of the present invention can perform file-copying actions on the files stored in those portable storage media and save them into appropriate portable storage media. Also, please refer to FIG. 3C, which the display unit 15 can only display the file name of the USB PORTABLE DISK 25 instead of displaying the file name of USB PORTABLE DISK 25 and portable hard disk 27 at the same time. Therefore, the display unit 15 of the portable file-copying apparatus 1 of the present invention can be setting selectively to display various file information and not limited to the display mode in our embodiments.

Figure 4:
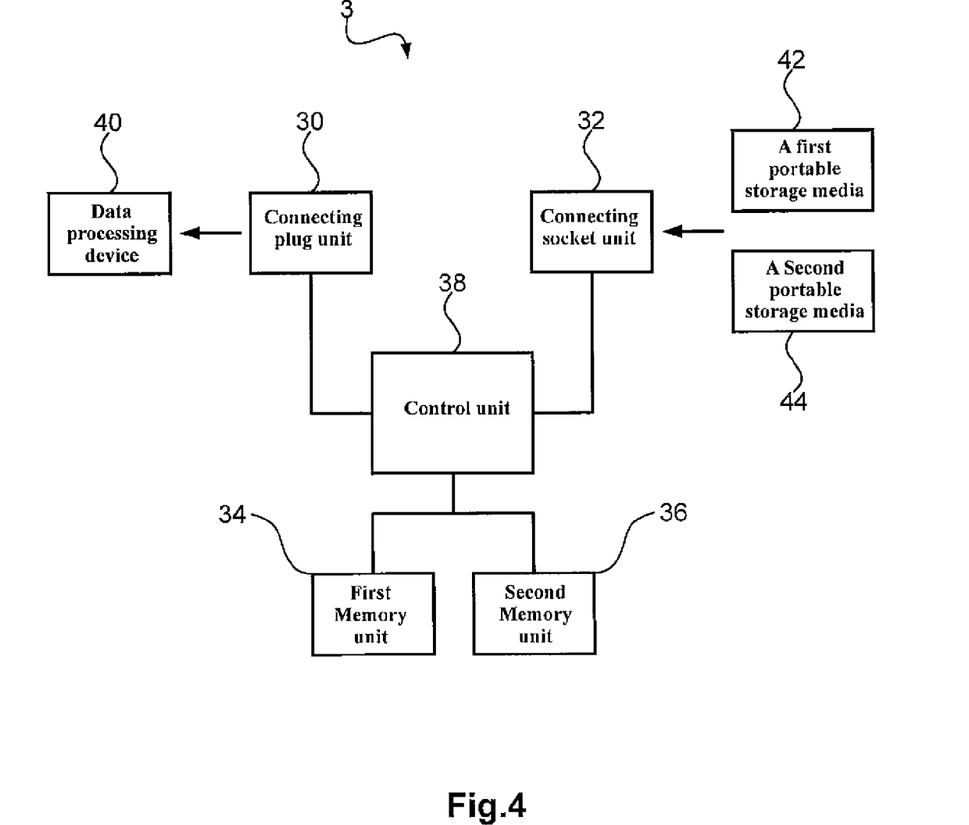
FIG. 4 illustrates the functional block diagram of an embodiment of portable file-copying apparatus of the present invention.

Please refer to FIG. 4, which is an illustration of the functional block diagram of one embodiment of portable file-copying apparatus of the present invention. As shown in FIG. 4, portable file-copying apparatus 3 of the present invention includes connecting plug unit 30, connecting socket unit 32, first memory unit 34, second memory unit 36 and control unit 38.

Among them, connecting plug unit 30 can be connected to a data processing device 40, for example but not limited to, personal computer. Connecting socket unit 32 can receive a first portable storage media 42 and/or a second portable storage media 44. Meanwhile, first portable storage media 42 includes original file. In real application, connecting plug unit 30 can be but not limited to USB connecting plug unit, and connecting socket unit 32 can be but not limited to USB connecting socket unit. In addition, during the real application, first portable storage media 42 and second portable storage media 44 can include but is not limited to, for example, flash memory or hard disk.

First memory unit 34 can include flash memory, and second memory unit 36 can include random access memory, for example, DRAM, SRAM. Please note that during the real application, first memory unit 34 and second memory unit 36 can include other appropriate memory and is not limited to the embodiment as shown here.

In addition, control unit 38 is connected respectively to the connecting plug unit 30, the connecting socket unit 32, first memory unit 34 and second memory unit 36 so as to, in accordance with the control signal, selectively perform data access (for example, get file from data processing device 40 or save the file in memory unit 34, 36 to data processing device 40) with the data processing device 40. Or, control unit 38 can, in accordance with control signal, selectively save the original file to first memory unit 34 or second memory unit 36, then transfer the original file from memory unit 34, 36 to second portable storage media 44.

Figure 5A:
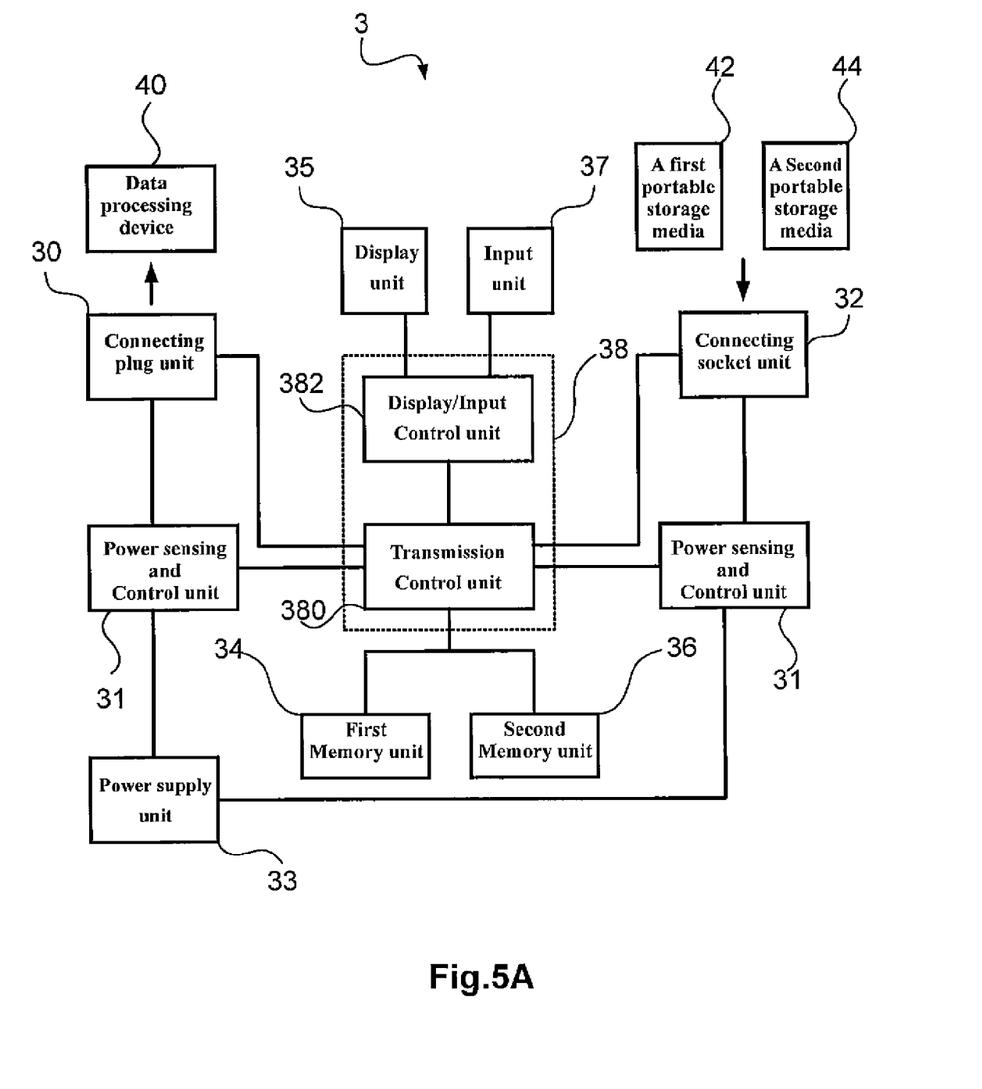
FIG. 5A illustrates the functional diagram of an embodiment of portable file-copying apparatus of the present invention.
Figure 5B:
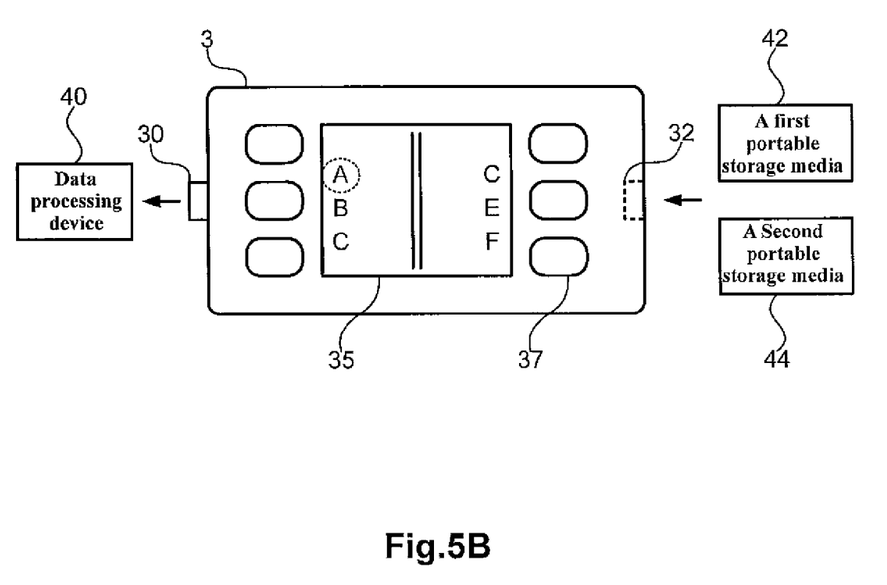
FIG. 5B illustrates portable file-copying apparatus of FIG. 5A.

Please also refer to FIG. 5A and FIG. 5B. FIG. 5A illustrates the functional block diagram of one embodiment of portable file-copying apparatus of the present invention; and FIG. 5B is an illustration of portable file-copying apparatus of FIG. 5A. As shown in FIG. 5A and FIG. 5B, the portable file-copying apparatus 3 of the present invention, in addition to the above mentioned connecting plug unit 30, connecting socket unit 32, first memory unit 34, second memory unit 36 and control unit 38, it could further comprise of power sensing and control unit 31, power supply unit 33, display unit 35 and input unit 37. In addition, control unit 38 can further consist of control unit 380 and display/input control unit 382.

Power sensing and control unit 31 can be connected respectively to the connecting plug unit 30, connecting socket unit 32 and control unit 38 so as to detect the transmission speed of data processing device 40 and to receive the power supplied by data processing device 40. Power supply unit 33, for example, the battery can provide the power needed by portable file-copying apparatus 3, first portable storage media 42 and second portable storage media 44. In real application, power supply unit 33 can provide the power in accordance with the voltage-rising circuit.

Display unit 35, for example but not limited to, LCD display screen or OLED display screen can be connected to display/input control unit 382 so as to display the related information in data processing device 40, first portable storage media 42, second portable storage media 44, first memory unit 34 and second memory unit 36, for example but not limited to, the capacity used, residual capacity and file name, etc.

Input unit 37, for example but not limited to, key pad, touch panel, joystick, roller, etc., can be connected to display/input control unit 382 so that the user can input control signal in accordance with display unit 35. In real application, input unit 37 can be integrated with display unit 35 into touch screen.

Furthermore, transmission control unit 380 of control unit 38 is connected respectively to the connecting plug unit 30, the connecting socket unit 32, the first memory unit 34 and the second memory unit 36 so that file access is performed, in accordance with control signal, selectively with data processing device 40; meanwhile, transmission control unit 380 can, according to control signal, selectively save the original file to first memory unit 34 or second memory unit 36. Display/input control unit 382 is connected respectively transmission control unit 380, display unit 35 and input unit 37 so as to control display unit 35, to receive the control signal generated by the operation of input unit 37 by the user and then transmit the control signal to transmission control unit 380.

For example, the above mentioned portable file-copying apparatus 3 can be used as normal portable disk. At this moment, can use connecting plug unit 30 to plug portable file-copying apparatus 3 to data processing device 40, and through display unit 35 and accompanied with the operation of input unit 37, the file in data processing device 40 can be copied to first memory unit 34 or second memory unit 36. Or, the user can, through display unit 35 and accompanied with the operation of input unit 37, send file in memory unit 34 or second memory unit 36 to data processing device 40.

Take another example and we can see that the above mentioned portable file-copying apparatus 3 can be used as file copying purpose among portable storage media. At this moment, the user can plug first portable storage media 42 which contains the original file to connecting socket unit 32, and through display unit 35 and accompanied with the operation of input unit 37, the original file can be copied to first memory unit 34 or second memory unit 36. Subsequently, the user can remove first portable storage media 42 and plug second portable storage media 44 to connecting socket unit 32. Next, through display unit 35 and accompanied with the operation of input unit 37, file in first memory unit 34 or second memory unit 36 will be sent to second portable storage media 44 so as to complete the process of copying the original file from first portable storage media 42 to second portable storage media 44.

Please note that in real application, the dimension of portable file-copying apparatus of the present invention and the appearance can be designed according to the requirement; moreover, the connecting unit quantity and type can be adjusted according to the need and is not limited to the above mentioned embodiment. In addition, in real application, the portable file-copying apparatus of the present invention can be integrated to portable electronic device, and the portable electronic device can be but not limited to, for example, MP3 Player, game machine, electronic dictionary, personal digital assistant or mobile communication device.

To sum up the above, we can see that the portable file-copying apparatus of the present invention can, does not need a PC to copy the data in USB PORTABLE DISK to other portable storage media. In addition, the portable file-copying apparatus of the present invention itself can also be used as portable storage media. Therefore, the portable file-copying apparatus of the present invention is very flexible and it can facilitate the file storage and copying of the user.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A handheld file-copying device, comprising:
a first connecting socket unit used to receive a first portable storage media and the first portable storage media storing an original file;
a second connecting socket unit used to receive a second portable storage media;
a control unit directly connected to the first connecting socket unit, the second connecting socket unit and a memory unit, respectively, the control unit in accordance with a control signal storing the original file from the first portable storage media to the memory unit and copying the original file to the second portable storage media; and
a power supply unit used to provide power for the handheld file-copying device, the first portable storage media and the second portable storage media,
wherein the control unit further includes:
a transmission control unit which is connected respectively to the first connecting socket unit, the second connecting socket unit and a memory unit, so as to, in accordance with the control signal, save the original file to the memory unit, wherein the original file is copied to the second portable storage media; and
a display/input control unit that is connected respectively to the transmission control unit, a display unit and an input unit so as to control the display unit and to receive a control signal generated by a user when the user operates the input unit and to send the control signal to the transmission control unit.

2. The handheld file-copying device of claim 1, further comprising:
a power sensing and control unit, which is connected respectively to the first connecting socket unit and the control unit so as to detect one operation speed of the first portable storage media.

3. The handheld file-copying device of claim 1, further comprising:
the display unit, which is connected to the control unit so as to display the related information of the first portable storage media, the second portable storage media and the memory unit.

4. The handheld file-copying device of claim 1, further comprising:
the input unit which is connected to the control unit so that an user uses the input unit to generate a control signal.

5. The handheld file-copying device of claim 1, wherein the first portable storage media includes a flash memory or a hard disk drive.

6. The handheld file-copying device of claim 1, wherein the second portable storage media includes a flash memory or a hard disk drive.

7. The handheld file-copying device of claim 1, wherein the first connecting socket unit is a USB connecting socket unit.

8. The handheld file-copying device of claim 1, wherein the second connecting socket unit is a USB connecting socket unit.

9. The handheld file-copying device of claim 1, wherein the handheld file-copying device is integrated into a portable electronic device; meanwhile, and the portable electronic device is a MP3 Player, game machine, an electronic dictionary, a personal digital assistant or a mobile communication device.

* * * * *